United States Patent [19]

Amrein et al.

[11] 4,104,752

[45] Aug. 8, 1978

[54] MULTIPURPOSE TOOL

[76] Inventors: Wayne Thomas Amrein, 1105 Apt. F. D'Long Rd., Baltimore, Md. 21228; Stokes, Jr. Bernard E., 2639 Rayner Ave., Baltimore, Md. 21216

[21] Appl. No.: 759,987

[22] Filed: Jan. 17, 1977

[51] Int. Cl.² .............................................. B25B 7/22
[52] U.S. Cl. ...................................... 7/107; 81/9.5 B; 7/133
[58] Field of Search ................. 7/5.4; 81/9.5 R, 9.5 B; 30/90.1

[56] References Cited

U.S. PATENT DOCUMENTS

| 3,733,627 | 5/1973 | Epstein | 7/5.4 |
| 3,777,323 | 12/1973 | Ingram | 7/5.4 |
| 3,921,237 | 11/1975 | Steiner | 7/5.4 |

FOREIGN PATENT DOCUMENTS 2,245,639  3/1974  Fed. Rep. of Germany ............... 7/5.4

*Primary Examiner*—James L. Jones, Jr.
*Assistant Examiner*—James G. Smith
*Attorney, Agent, or Firm*—Morton J. Rosenberg

[57] ABSTRACT

A multipurpose tool which is in the form of a basic plier but provides the user with a multiplicity of functions. The multipurpose tool includes rotationally displaceable head and handle portions formed in generally one piece construction with each pair of handle and head portions rotatably mounted each to the other in a standard form of a plier. Each of the head portions includes plier stripping elements for removing insulation from wire inserted within one of a plurality of recesses. Teeth members are provided for gripping elements having a longitudinal groove between an associated pair of head portions of the mulltipurpose tool. Additionally, wire cutting elements are provided on the head portions in order that wire or flexible elements may be cut or otherwise sheared when the multipurpose tool is rotatably displaced to a closed position. Reaming elements are provided on a lateral surface of the head portions of the multiple purpose tool to allow insert into a conduit opening for contact with an inner wall thereof. Rotation of the multipurpose tool within the conduit opening allows for smoothing out of the inner wall of the conduit. The handle portions of the multipurpose tool include flexible element crimping means for contouring a flexible element in a particular manner and further includes a section utilized and contoured specifically to permit the pulling of a flexible member captured between opposing members of the handle portions when the multipurpose tool is in a closed position.

10 Claims, 9 Drawing Figures

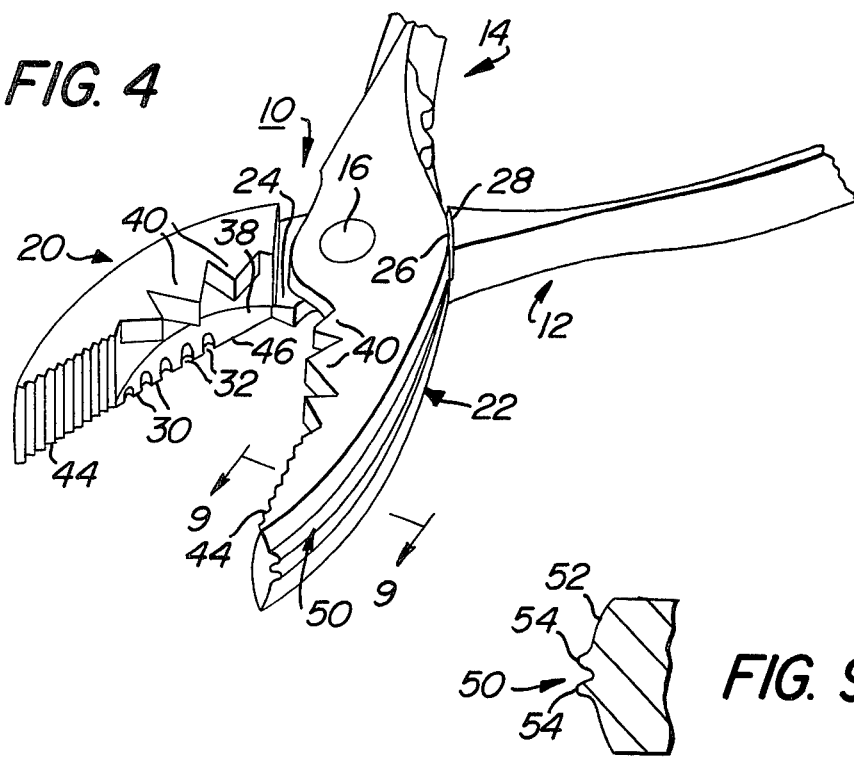
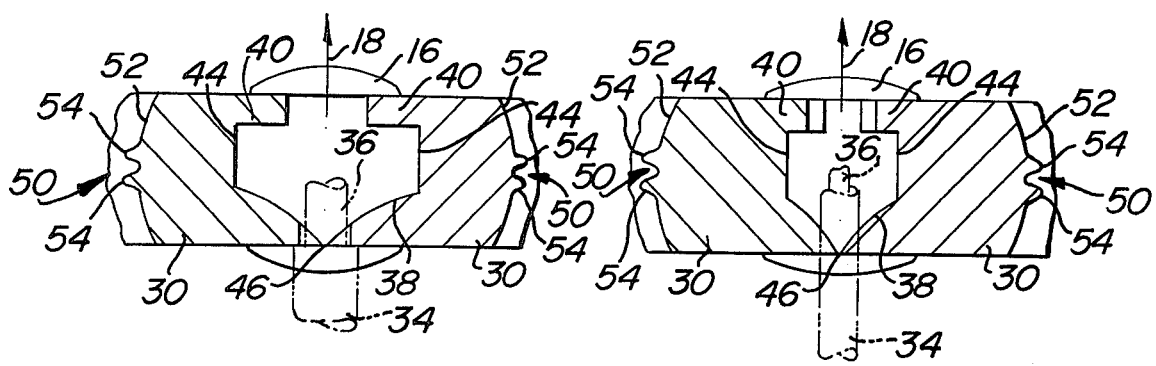
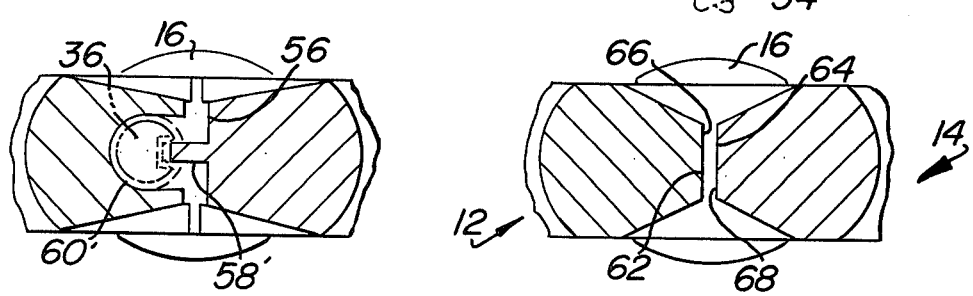

MULTIPURPOSE TOOL

BACKGROUND OF THE INVENTION

1. Field of the Invention

This invention pertains to plier like tools utilized for a plurality of purposes. In particular, this invention relates to a multipurpose tool which may be utilized for frictionally gripping work pieces in the manner of a standard plier. More in particular, this invention relates to a multipurpose tool which may be utilized as an insulation stripping tool member. Further, this invention relates to a multipurpose tool which may be utilized for gripping work pieces having longitudinal grooves formed therein. Still further, this invention relates to a flexible member cutting type of multipurpose tool. Additionally, this invention relates to a multipurpose tool which may be utilized for conduit reaming operations. More in particular, this invention pertains to a multipurpose tool which includes wire or other flexible element crimping mechanisms formed within a handle portion of the multipurpose tool. Still further, this invention pertains to a multipurpose tool which has a uniquely contoured handle section to permit frictional gripping and pulling of flexible elements.

2. Prior Art

Prior type tools are well known in the art. Additionally, prior like tools having insulation stripping recesses are also known in the art. However, such prior like tools are not adapted for gripping of longitudinally directed groove elements and other types of tools must be utilized for such purposes.

Crimping of flexible elements by crimping tools are known in the art. However, such crimping elements are generally not placed in combination in the same tool member as wire insulation stripping devices. This necessitates the use of a number of tool members to accomplish the same purposes as the invention as is herein described. Still further, such crimping types of elements are positionally located in the head portions of plier like tools. Such positioning and location of crimping element does not provide for sufficient force loading to provide an adequate crimping contour.

Additionally, some prior tools provide for flat or planar faces for gripping materials therebetween. However, in some prior tools, such is not placed in combination with crimping elements, wire cutting elements, insulation stripping elements and friction gripping elements which necessitate the maintenance of a wide variety of tools.

In other prior tools, where crimping elements are provided, such are generally provided with one set of recesses and lug members to provide a particular contour. Such prior tools do not allow the user to determine different or unique crimping contours as is necessitated by the specific operation being performed.

SUMMARY OF THE INVENTION

A multipurpose tool which includes a pair of handle portions adapted to be gripped in the hand of a user. The multipurpose tool has a pair of head portions with each being formed in one piece formation with a respective handle portion. Each of the handle and head portions are rotatably mounted to the other about a pivot point. The tool includes a wire stripping mechanism formed in each of the head portions. The wire stripping mechanism has at least one recess of a predetermined diameter formed within each of the head portions and is adapted for cutting insulation on wire when the recesses are displaced into contiguous alignment defining a closed tool position. The multipurpose tool further includes a tooth gripping device formed in each of the head portions. The tooth gripping device has at least a pair of teeth formed in each of the head portions adjacent the wire stripping means and displaced therefrom in a direction coincident with an axis line of the pivot point.

An object of the instant invention is to provide a multipurpose tool which may be utilized as a standard plier.

Another object of the instant invention is to provide a plier like multipurpose tool which may be utilized for insulation stripping from wire of differing diameters.

A still further object of the instant invention is to provide a flexible element cutting device which may be utilized in conjunction with the remaining elements of the multipurpose tool.

Another object of the invention is to provide a multipurpose tool which may be utilized as a wire nut gripping device for elements having longitudinal grooves formed therein.

A still further object of the instant invention is to provide a multipurpose tool which may be utilized as a conduit reaming tool.

Another object of the instant invention is to provide a tool which may be used as a flexible element crimping device.

A still further object of this invention is to provide a device having a handle section contoured in a particular manner so as to allow flexible element pulling without damage of the flexible element.

BRIEF DESCRIPTION OF THE DRAWINGS

FIG. 4 is a perspective view of a portion of the multipurpose tool when taken in the open position;

FIG. 5 is a sectional view of the multipurpose tool when taken along the section line 5—5 of FIG. 1;

FIG. 6 is a sectional view of the multipurpose tool when taken along the section line 6—6 of FIG. 1;

FIG. 7 is a sectional view of the multipurpose tool taken along the section line 7—7 of FIG. 1;

FIG. 8 is a sectional view of the multipurpose tool taken along the section line 8—8 of FIG. 1; and, FIG. 9 is a sectional view of the head portion of the multipurpose tool when taken along the section line 9—9 of FIG. 4.

DESCRIPTION OF THE PREFERRED EMBODIMENTS

Referring now to FIGS. 1-9 there is shown multipurpose tool 10 which may be utilized as a conventional plier and having a multiplicity of features particularly adaptable to electrical work but not restricted thereto. As will be seen in following paragraphs, the combination of elements provided on multipurpose tool 10 allow for frictional gripping of work pieces while at the same time allowing for wire stripping, cutting, crimping, wire nut engagement teeth, wire or other flexible element pulling, as well as reaming. In overall concept, tool 10 provides the user with one tool which is applicable to a wide variety of uses where a multiplicity of functions may be accomplished without the need for the user to acquire or otherwise maintain a plurality of tool members.

Figure 1:
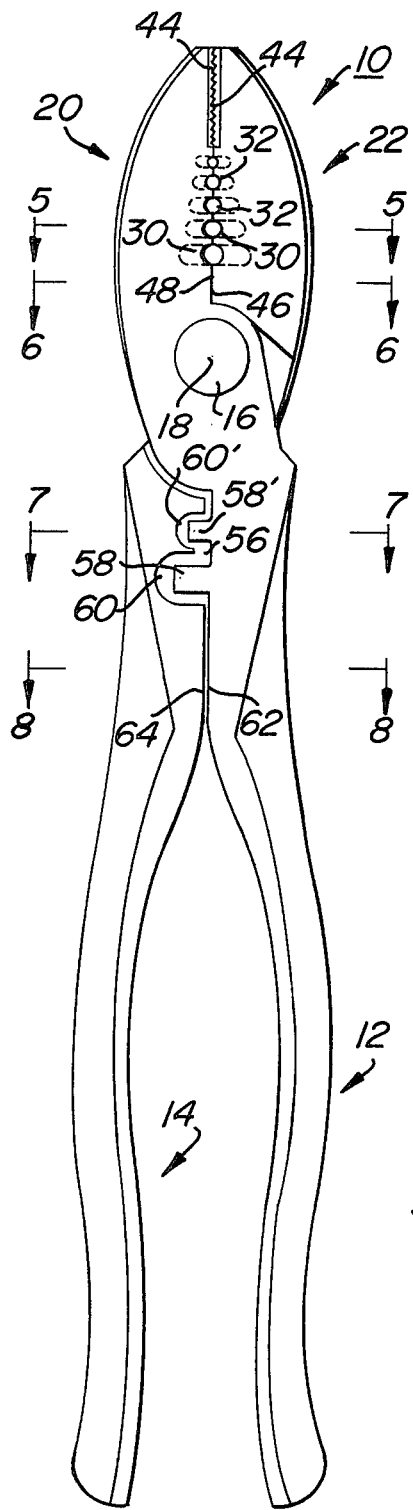
FIG. 1 is a front view of the multipurpose tool.
Figure 2:
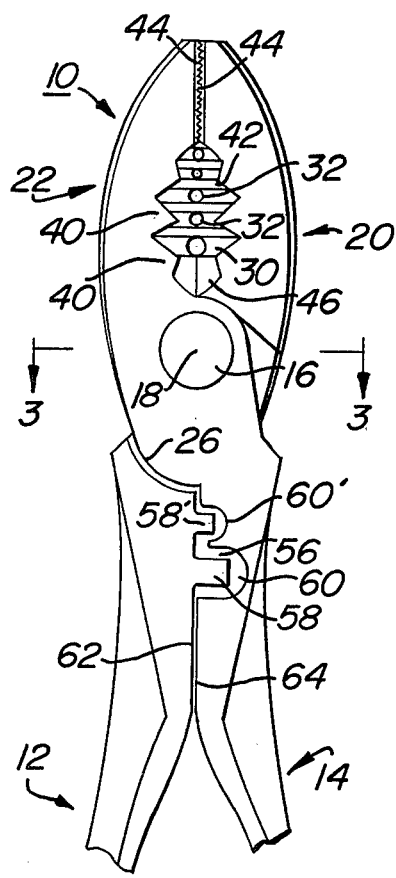
FIG. 2 is a back view of the multipurpose tool as shown in FIG. 1 with a portion being cut away.
Figure 3:
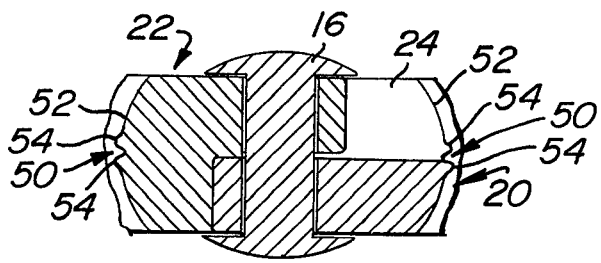
FIG. 3 is a sectional view taken along the section line 3—3 of FIG. 2.

Referring now to FIGS. 1 and 2 multipurpose tool 10 includes handle portions 12 and 14 which are particularly adapted to be gripped in the hand of a user. Handle portions 12 and 14 are rotatably displaceable with respect to each other through and around an axis of pivot member 16. Pivot member 16 may be a conventional double bolt type securement device to allow rotation of handle portions 12 and 14 while maintaining constrainment therebetween in a direction coincident with axis line 18, shown for illustrative purposes in FIGS. 5 and 6 and represented by central point in FIGS. 1 and 2.

Head portions 20 and 22 are formed in one piece construction with respective handle portions 12 and 14. As is seen, and is conventional in the art, handle and head portions 12 and 20 are positionally located in overlying relation with respect to handle and head portions 14 and 22 and permit rotational displacement therebetween. For purposes of clarity in description, the portions of multipurpose tool 10 formed above pivot member 16 as shown in FIGS. 1 and 2 will be described in conjunction with head portions 20 and 22. In similar fashion, those sections of multipurpose tool 10 as shown in FIGS. 1 and 2 lying below pivot member 16 will be described as portions or sections of handle elements 12 and 14.

For purposes of operation, although not critical to the inventive concept as is herein described, it is seen in FIG. 4 that handle and head portions 14 and 22 are insertable within recess or cavity 24 and is rotatably secured therein in a manner to provide for alignment between operating elements in head portions 20 and 22 as will be described in following paragraphs.

Curvilinear contour 26 on handle portion 14 corresponds to contour 28 on handle portion 12 in order that rotative displacement may be effected. By providing recess 24, handle portions 12 and head portion 22 may have a coplanar upper surface. In similar fashion, handle portions 14 and head portion 22 may also include a recess or cavity area for insert of handle section 12 and head portion 20.

In overall construction, multipurpose tool 10 may be formed of a hardened steel or some like material not important to the inventive concept as is herein described with the exception that the material chosen must have sufficient load bearing strength for the purposes intended.

Referring now to FIGS. 1, 2 and 4–6, there is shown wire stripping elements 30 which are formed in each of head portions 20 and 22. Wire stripping elements 30 include a plurality of recesses 32 having a semicircular contour with each recess of predetermined diameter formed within each of head portions 20 and 22. Recesses 32 are adapted for cutting insulation 34 on wire 36 when recesses 32 are displaced into contiguous alignment defining a closed position as shown in FIGS. 1 and 2. Wire stripping elements 30 may include a lower inclined wall section 38 in order to provide a cutting edge in a lower region of stripping elements 30. Thus, wire 36 containing insulation 34 may be inserted into an appropriate sized recess 32 and handles 12 and 14 may be moved into a closed position. Elements 30 then grippingly engage the peripheral area of insulation 34 and further closure causes cutting around the circumference thereof. Once insulation 34 has been cut to the outer diameter of wire 36, multipurpose tool may be displaced in a direction coincident with axis line 18 and insulation 34 is removed from wire 36.

Wire stripping elements 30, are formed on one side of head portions 20 and 22 of tool 10 as is clearly seen in FIGS. 1, 2 and 4. On an opposing side when taken with respect to directional line 18, there is shown tooth gripping elements 40 formed in each of head portions 20 and 22. Teeth 40 are formed adjacent wire stripping elements 30 and displaced therefrom in a direction coincident with axis line 18 of pivot member 16. As can been seen in FIG. 2, when multipurpose tool is in a closed position, tooth elements 40 provide for opening 42 which is substantially larger than the openings of recesses 32 when such are in contiguous alignment. Teeth 40 are provided for insert of larger elements such as wire nuts which are well known in the art. Such wire nuts generally include groove sections which extend in a direction coincident with axis line 18 when wire nuts are inserted between opposing teeth 40. Thus, such wire nuts of differing size may be grippingly engaged between teeth 40 on opposing head sections 20 and 22. As can be seen in FIGS. 5 and 6, teeth 40 and wire stripping elements 30 are joined in one piece formation through vertical side walls 44.

Thus, it is clearly seen that one side of tool 10 may be utilized for insert of wire 36 having insulation 34 surrounding such and provision being made for removal of insulation 34 in the manner previously described. By reversing the orientation of multipurpose tool 10, wire nuts or other elements having longitudinal grooves formed therein may be gripped by tooth grip elements 40 in an uncomplicated manner. As can clearly be seen in FIGS. 2 and 4, each of tooth members 40 may extend inwardly by a differing amount in order that a multiplicity of wire nut diameter sizes may easily be gripped between adjacent alignable teeth 40.

Head portions 20 and 22 further include frictional gripping elements 44 formed on distal sections of each of head portions 20 and 22 when taken with respect to pivot member 16. Frictional gripping elements 44 are displaced from wire stripping elements 30 and teeth 40 in a direction which is substantially normal to pivot point axis 18. Frictional gripping elements 44 may constitute a knurled section or provide for vertical groove sections which are adapted to engage a work piece captured between opposing elements 44 on head sections 20 and 22. In this manner, multipurpose tool 10 may further be utilized as a standard plier element.

Inclined wall member 38 shown in FIG. 4 further provides for a wire cutting mechanism in a manner to be described. As can be seen, recesses 32 provide for alignable openings within which insulation coated wire 36 may be inserted for the purpose of stripping insulation 34 from wire 36. However, as shown in FIG. 1, in wire cutting area 48 opposing inclined surfaces 38 as shown in FIGS. 4, 5 and 6, extend downwardly to knife edge 46 which extends in a direction substantially normal to axis line 18. Inclined downwardly depending surface 38 in combination with knife edges 46 on opposing head sections 20 and 22 provide for a means whereby wire or other elements may be cut. As can be seen in FIG. 1, when tool 10 is placed in a closed position opposing knife edges 46 are moveably displaced into aligned mating and contiguous contact each with respect to the other for purposes of permitting shearing or other destructive cutting of a work piece inserted therebetween.

Referring now to FIGS. 4 and 9, head portions 20 and 22 are seen to include a reaming element formed on lateral surface 52 of head sections 20 and 22. As is clearly evident in FIG. 9, reaming element 50 includes a pair of ridge elements 54 which extend in an outward manner from lateral surface 52. In this way, multipurpose tool 10 may be inserted into the end of a conduit having an opening. Tool 10 may be placed in an open position as shown in FIG. 4 until ridge elements 54 engage the internal surface of the conduit. The user may then rotate tool 10 in order to smooth out the internal wall section of the conduit opening in an easy manner.

Thus, head sections 20 and 22 of multipurpose tool 10 may be utilized for gripping work pieces between frictional gripping elements 44 in the normal manner or function of standard pliers. Additionally, head portions 20 and 22 may be utilized for wire stripping by engaging wire 36 containing insulation 34 between opposing alignable recesses 32. Still further, flexible elements or wire may be cut utilizing knife edges 46 which allows cutting of such elements when tool 10 is placed in a closed position as is shown in FIGS. 1 and 2. Wire nuts or other types of elements having longitudinal grooves may be grasped between tooth members 40 formed above wire stripping elements 30 as is shown in FIG. 4. Finally, head members 20 and 22 may be utilized for reaming operations through use of a ridge elements 54 formed in a manner shown in FIG. 9 above lateral surface 52.

Turning now to handle portions 12 and 14 as is seen in FIGS. 1, 2 and 7 there is shown crimping device 56 for crimping wire 36 or some other flexible type element into a predetermined contour. Handle portion 12 includes lug extension members 58 and 58' of differing length which are insertable within crimping recesses 60 and 60' of handle portion 14. As can be seen, recesses 60 and 60' are formed within handle portion 14 and provide a cavity or recess which is substantially larger than the dimensions of lug members 58 and 58'. Lug members 58 and 58' are insertable within the cavity formed by crimping recesses 60 and 60' for contouring and capturing flexible element or wire 36 therebetween when tool 10 is displaced to the closed position as is shown in FIGS. 1, 2 and 7. Thus, by the utilization of recesses 60 and 60' of different diameters, contouring of flexible element 36 may be performed in unique diameter dimensions or contours as is necessitated by the user. The mode of contouring is by insert of flexible element 36 within either recess 60 or 60' when tool 10 is in an open position as shown in FIG. 4. Tool 10 is rotatably displaced around pivot member 16 until lug extension members 58 and 58' contact flexible member 36 disposed within recesses 60 and 60'. Continued closure of tool 10 causes flexible element 36 to be contoured to the appropriate dimension between the recesses 60, 60' and 58, 58'.

Referring now to FIGS. 1, 2 and 8 there are shown linearly directed handle portions 62 and 64 associated respectively with handle portions 12 and 14. Linearly directed sections 62 and 64 include planar surfaces 66 and 68 which are displaced each from the other when tool 10 is in a closed position. Sections 62 and 64 extend in a direction substantially normal to axis line 18 of pivot member 16. Thus, a flexible element may be inserted between sections 62 and 64 when tool 10 is in an open position, and then tool 10 may be placed in a closed position as shown in FIGS. 1 and 2 for purposes of utilizing multipurpose tool 10 as a flexible element puller. It will be noted that surfaces 66 and 68 which are planar in nature are not grooved or otherwise indented in order that frictional gripping without cutting may be accomplished. This particular contouring and forming of sections 62 and 64 allows the user to accomplish the pulling operation without fear of causing an unwanted cutting or shearing of the material captured therebetween. Although not important to the inventive concept as is herein described, surfaces 66 and 68 are generally formed to be displaced one from the other in the dimensional range approximating between 1/16-⅛ of an inch.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases particular locations of elements may be reversed or interposed, all without departing from the spirit or scope of the invention as defined in the appended claims.

We claim:

1. A multipurpose tool comprising:
   (a) a pair of handle portions adapted to be gripped in the hand of a user;
   (b) a pair of head portions each being formed in one piece formation with a respective handle portion, each of said handle and head portions being rotatably mounted to the other about a pivot point;
   (c) wire stripping means formed in each of said head portions, said wire stripping means including at least one recess of predetermined diameter formed within each of said head portions and adapted for cutting insulation on wire when said recesses are displaced into contiguous alignment defining a closed position; and,
   (d) tooth gripping means formed in each of said head portions, said tooth gripping means including at least a pair of teeth formed in each of said head portions adjacent said wire stripping means and displaced therefrom in a direction coincident with an axis line of said pivot point, said tooth gripping means and said wire stripping means being formed in one piece formation on opposing surfaces of said head portions with respect to said axis line direction, said teeth of said tooth gripping means forming an opening greater than said recess diameter when said tool is in said closed position.

2. The multipurpose tool as recited in claim 1 where each of said head portions include frictional gripping means formed on a distal section of each of said head portions when taken with respect to said pivot point, said frictional gripping means being displaced from said wire stripping means and said tooth gripping means in a direction substantially normal to said pivot point axis.

3. The multipurpose tool as recited in claim 1 where said tooth gripping means on each of said head portions provides an opening of predetermined size when said recesses are in contiguous alignment.

4. The multipurpose tool as recited in claim 1 where said wire stripping means and said tooth gripping means are formed in one piece construction with said head portions.

5. The multipurpose tool as recited in claim 1 including wire cutting means formed on each of said head portions, said wire cutting means formed adjacent said wire stripping means.

6. The multipurpose tool as recited in claim 5 where said wire cutting means includes a pair of knife edges extending in a direction substantially normal to an axis line of said pivot point, said knife edges for mating engagement when said recesses are displaced into said contiguous alignment.

7. The multipurpose tool as recited in claim 1 where said handle portions include wire crimp means, said wire crimp means including:
   (a) at least one recess formed within one of said handle portions; and,
   (b) at least one lug member formed on the other of said handle portions, said lug member being insertable within said recess for capturing and contouring a flexible element therebetween when said tool is displaced to said closed position.

8. The multipurpose tool as recited in claim 7 where said wire crimp means includes a plurality of recesses of different diameter for contouring of said flexible element into unique diameter contours.

9. The multipurpose tool as recited in claim 1 including reaming means formed said head portions of said tool, said reaming means including at least one ridge element extending from a lateral surface of said head portions for internal insert into a conduit opening.

10. The multipurpose tool as recited in claim 9 where said head portions lateral surfaces are curvilinearly contoured for engaging an internal wall section of said conduit opening.

* * * * *